April 8, 1924. 1,489,678.
S. TCHAYEFF
METHOD OF AND APPARATUS FOR MAKING MATERIAL FOR CONSTRUCTIONAL PURPOSES
Filed April 11, 1922 2 Sheets-Sheet 1
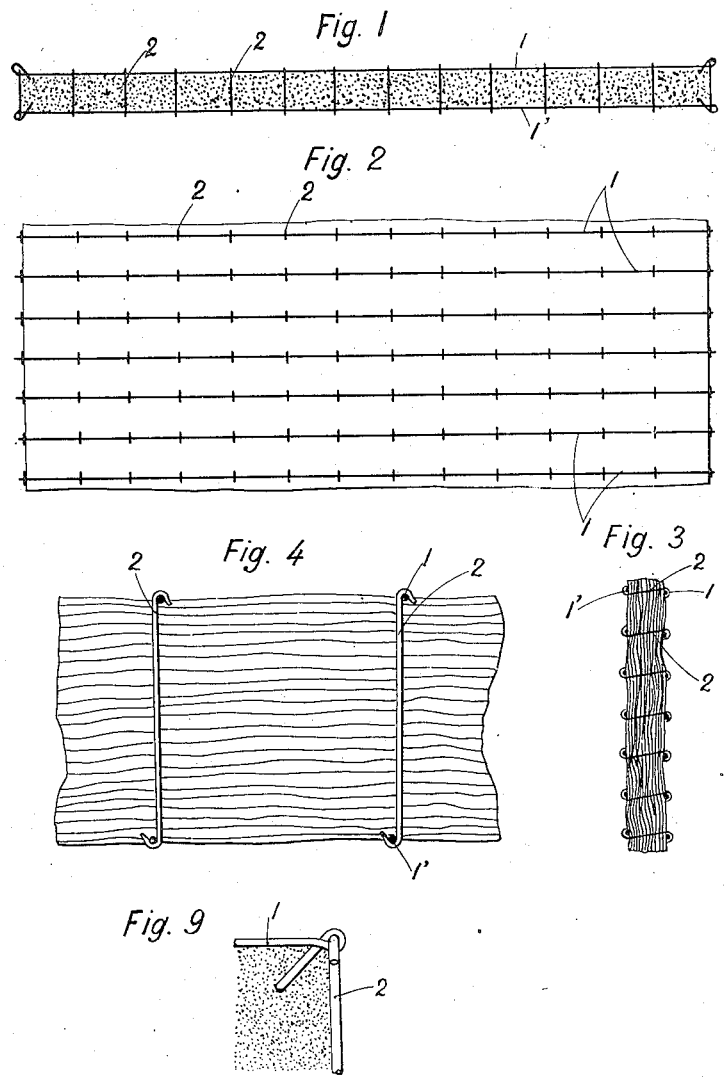
Inventor
S. Tchayeff,
By Marks & Clerk
Attys.

Patented Apr. 8, 1924.

1,489,678

UNITED STATES PATENT OFFICE.

SERGE TCHAYEFF, OF PARIS, FRANCE.

METHOD OF AND APPARATUS FOR MAKING MATERIAL FOR CONSTRUCTIONAL PURPOSES.

Application filed April 11, 1922. Serial No. 551,747.

*To all whom it may concern:*

Be it known that I, SERGE TCHAYEFF, a citizen of Russia, residing at Paris, Department of the Seine, in France, have invented certain new and useful Methods of and Apparatus for Making Material for Constructional Purposes, of which the following is a specification.

The invention relates to a method and apparatus for making material for constructional purposes, the said material being of vegetable matter such as straw, reeds, etc. Heretofore similar materials have been employed or connected, plaited or woven together. Attempts have been made to obtain pressed straw panels, but their resistance to mechanical forces and also to flexure or bending was very slight thus necessitating reinforcement by the introduction into the mass of the material boards of wood or plates of other rigid material.

According to the present invention similar materials acquire after suitable treatment a great resistance to compression, tension and flexure or bending and become practically and perfectly fireproof.

With this object in view and according to the present invention the bundles of straw, reeds, etc., are introduced in more or less equal proportions and in a perpendicular direction between two rows of metallic wires, the said bundles being successively compressed by means of hooks which act to maintain the two rows of metallic wires the desired distance apart so that the whole construction of compressed straw or reeds is reinforced by an interconnected wire framework, thus rendering the whole very rigid and resistant.

The number of wires and hooks and their distance apart are chosen in accordance with the resistance required for the straw, reed or like plate or panel so formed.

The apparatus for carrying out the method is given by way of example but it should be understood that the apparatus hereinafter described is capable of many modifications according to requirements. The example given is, however, the simplest and describes the continuous manufacture of panels.

The accompanying Figures 1 to 9 show clearly how this new product or article is obtained as well as its method of manufacture, In these figures:

Figure 1 is a longitudinal section of a reinforced panel in accordance with the invention.

Figure 2 is a corresponding plan.

Figure 3 is a cross section of the same panel.

Figure 4 is a similar section drawn to an enlarged scale.

Figure 5:
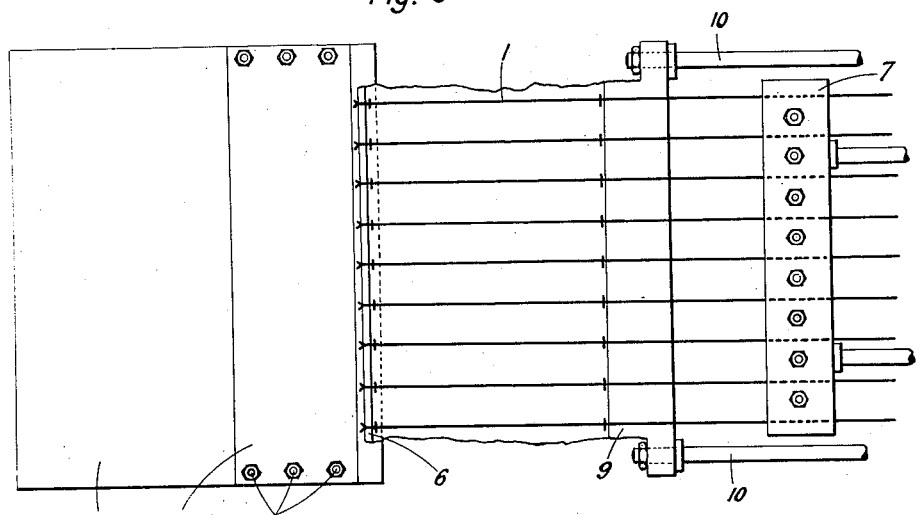
Figure 6:
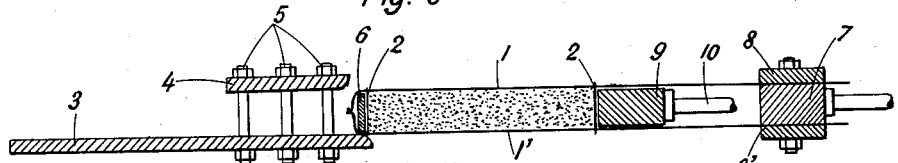
Figure 7:
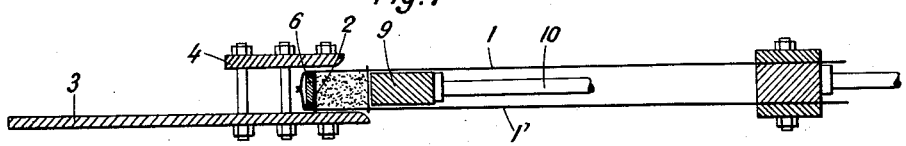
Figure 8:
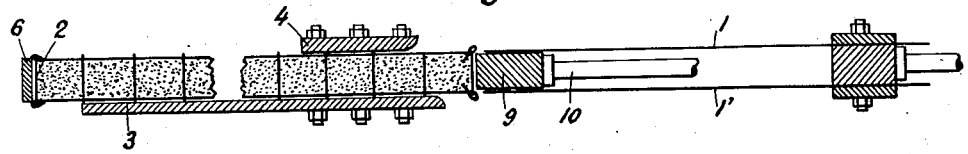

Fig. 5 is a top plan view of one form of the apparatus for carrying out the improved method, Fig. 6 is a longitudinal sectional view of the same showing one section of the straw at the beginning of the operation, Fig. 7 is a similar view showing the section of straw compressed, Fig. 8 is a similar view showing the end of one complete operation, that is with several sections united at the desired width, and Fig. 9 is an enlarged fragmentary sectional detail of a portion of a straw section showing a reinforcing means.

The panel manufactured in accordance with the present invention is formed of two parallel rows of metallic wires 1 and 1', the number, thickness and distance apart of which one from the other are calculated according to requirements.

The wires of these two parallel rows are united or connected by cross hooks 2 of equal length which maintain them the desired distance apart. The straw or like materials is or are placed between these rows of wires and hooks and compressed as hereinafter described.

At the ends of the panel the longitudinal wires are engaged by or twisted round the hooks and at a certain length are thrust into the straw as indicated in Figure 9, drawn to an enlarged scale, so that the ends of the wires do not project to the exterior of the panel.

In these conditions the panel may be utilized for forming partitions, walls, coverings, etc. It is evident that the resistance of the straw itself which is zero in planes parallel to the fibres has not increased, but this method of manufacture has changed the network of reinforcing wires into a rigid beam the panels or bays of which cannot be deformed by reason of the support given to them by the strongly compressed straw interposed between the wires. The panel is therefore composed of a series of small beams of rectangular gratings or latticework supported by the compressed straw and its total resistance equals the sum of the individual resistance of each of the beams.

Its resistance to traction may be considered as the sum of the resistance of each longitudinal wire.

It will be seen that the panels and plates of this type can be calculated according to the rules for the resistance of materials.

Their leading properties are as follows:—

Great resistance combined with lightness, incombustibility, bad thermal conductivity, possibility of manufacture in situ where the materials exist and where the constructions are required to be erected, gives considerable surface for the efficient adherence of plaster, clay, fire-clay or other like material; great facility in assembling and fixing by means of nails, bolts, etc., without the previous piercing of holes, slots, etc., which is detrimental to the rigidity of the structure, this latter point being of great importance in the construction of walls, partitions, coverings, etc.; adaptability for use as insulating material for refrigerators, more especially for wagons and boats wherein the weight and the solidity or rigidity form an extremely important part of the construction.

The apparatus represented in Figures 5, 6, 7 and 8 may be utilized for the manufacture of these panels of any suitable width and length.

During the manufacture the panel is supported on a plate or table 3 at the entrance to which is placed a transverse guide 4, the distance between the guide and the table being determined by the thickness of the panel to be formed, plus a certain amount of play, this distance being regulated by suitable bolts 5— 5— 5.

The longitudinal wires 1 and 1' of any desired number are mounted at one side on a plate 6 of any suitable height and length, the ends of the said wires being twisted at the rear of the plate. Hooks 2 are finally placed on the wires 1 and 1' at the interior against the plate 6. The wires 1, 1' are arranged on two sets of drums and before being connected behind the plate 6 as hereinbefore stated they pass through a fixed brake. The latter comprises a block 7 and two plates 8, 8' locked on the wires by a suitable number of bolts.

In front of the brake is a rectangular beam 9 the ends of which carry two rods 10, 10 actuated by a press of any suitable type and power.

At the beginning of the operation the whole arrangement is as shewn in section in Figure 6, the straw being in position for introduction between the two rows of wires 1, 1' and the hooks 2 being placed between the cross beam 9 and the straw.

Under the action of the press the beam 9 is actuated compressing the straw with the hooks 2 against the plate 6 until the longitudinal wires commence to slide between the block 7 and the plates 8, 8'. This position is indicated in Figure 7. The hooks 2 follow the movement of the beam 9. After this first compression the cross beam 9 is moved rearwardly and the cycle of operations is renewed.

When a complete panel of a definite length has been obtained, as shewn in Figure 8, the plate 6 is disengaged and the ends of the longitudinal wires are twisted round the hooks and thrust into the compressed straw, as indicated in Figure 9.

The longitudinal wires may be disposed, not only on the surface of the panel, but also in the interior thereof.

Claims:

1. The method of producing reinforced vegetable matter construction material consisting in temporarily connecting and tautly holding a plurality of reinforcing strands in spaced parallel relation, inserting stems of vegetable matter intermittently between said reinforcing strands, then connecting the longitudinal strands, at intervals by transverse reinforcing strands, then intermittently compressing the material immediately subsequent to the connecting of each of the transverse strands, and finally permanently connecting the ends of the longitudinal strands to the transverse strands.

2. A method as claimed in claim 1 with the additional steps of continuously feeding and guiding the longitudinal strands in timed relation with the compressing of the vegetable material.

3. An apparatus for carrying out the process according to claim 2, a guide device for wires, a table, a guide plate arranged transversely of the table, and adjustably connected in spaced relation thereto, a rail operating between the table and guide plate for attaching and spacing the wires, and a plunger for compressing material between the wires toward the rail.

In testimony whereof I hereunto affix my signature.

SERGE TCHAYEFF.